US012759898B2

(12) United States Patent
Takiguchi et al.

(10) Patent No.: US 12,759,898 B2
(45) Date of Patent: Oct. 13, 2026

(54) LITHIUM METAL COMPOSITE OXIDE, POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

(71) Applicant: SUMITOMO METAL MINING CO., LTD., Tokyo (JP)

(72) Inventors: Marie Takiguchi, Osaka (JP); Daisuke Nagao, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 471 days.

(21) Appl. No.: 18/569,203

(22) PCT Filed: Jun. 14, 2022

(86) PCT No.: PCT/JP2022/023824
§ 371 (c)(1),
(2) Date: Dec. 11, 2023

(87) PCT Pub. No.: WO2022/265016
PCT Pub. Date: Dec. 22, 2022

(65) Prior Publication Data
US 2024/0286922 A1 Aug. 29, 2024

(30) Foreign Application Priority Data
Jun. 16, 2021 (JP) ................................ 2021-100125

(51) Int. Cl.
*C01G 53/50* (2025.01)
*H01M 10/052* (2010.01)

(52) U.S. Cl.
CPC .......... *C01G 53/50* (2013.01); *C01P 2002/72* (2013.01); *C01P 2004/03* (2013.01);
(Continued)

(58) Field of Classification Search
CPC .. C01G 53/50; C01P 2002/72; C01P 2004/03; C01P 2004/51; C01P 2004/61; C01P 2006/21; H01M 10/052
See application file for complete search history.

(56) References Cited

U.S. PATENT DOCUMENTS

2017/0054147 A1* 2/2017 Yokoyama .......... H01M 10/052
2017/0125808 A1 5/2017 Blangero et al.
(Continued)

FOREIGN PATENT DOCUMENTS

EP 3208872 A1 * 8/2017 ............ C01G 53/00
JP 2012-084552 A 4/2012
(Continued)

OTHER PUBLICATIONS

Machine Translation of KR-20080080938-A (May 15, 2026) (Year: 2026).*
(Continued)

*Primary Examiner* — Matthew J Merkling
(74) *Attorney, Agent, or Firm* — Foley & Lardner LLP

(57) ABSTRACT

A lithium metal composite oxide contains a secondary particle which is an aggregate of primary particles and a single particle which exists independently of the secondary particle, in which the lithium metal composite oxide has a layered rock-salt structure, is represented by Composition Formula (I), and satisfies (1) and (2) below.

(1): $1.2 \le L_A/L_B < 1.60$ ($L_A$ is a crystallite diameter obtained from a diffraction peak within the range of $2\theta=18.8\pm1°$ and $L_B$ is a crystallite diameter obtained from a diffraction peak within the range of $2\theta=38.3\pm1°$ in a diffraction peak obtained from powder X-ray diffraction using CuKα rays.)

(2): a Me occupancy at a lithium site in the layered rock-salt structure is 2.5% or less, as determined by (Continued)

analyzing the diffraction peaks by the Rietveld analysis method, and the Me is Ni, Co, Mn, or X1.

16 Claims, 4 Drawing Sheets

(52) U.S. Cl.
CPC ...... *C01P 2004/51* (2013.01); *C01P 2004/61* (2013.01); *C01P 2006/12* (2013.01); *H01M 10/052* (2013.01)

(56) References Cited

U.S. PATENT DOCUMENTS

| | | | | |
|---|---|---|---|---|
| 2019/0300382 | A1 | 10/2019 | Kim et al. | |
| 2021/0083286 | A1 | 3/2021 | Kuroda et al. | |
| 2021/0167377 | A1 * | 6/2021 | Kageura | H01M 10/0525 |
| 2024/0286922 | A1 * | 8/2024 | Takiguchi | H01M 4/131 |

FOREIGN PATENT DOCUMENTS

| | | | | | |
|---|---|---|---|---|---|
| JP | 2017-226576 | A | | 12/2017 | |
| JP | 2018-107053 | A | | 7/2018 | |
| JP | 2019083116 | A | * | 5/2019 | C01G 53/82 |
| JP | 2019-106241 | A | | 6/2019 | |
| KR | 20080080938 | A | * | 9/2008 | C01G 53/82 |
| KR | 10-2017-0018405 | A | | 2/2017 | |
| KR | 10-2020-0130819 | A | | 11/2020 | |
| WO | WO-2018/043189 | A1 | | 3/2018 | |

OTHER PUBLICATIONS

Machine Translation of JP-2019083116-A (May 15, 2026) (Year: 2026).*

International Searching Authority, “International Search Report,” issued in connection with International Patent Application No. PCT/JP2021/023824, dated Aug. 23, 2022.

International Searching Authority, “Written Opinion,” issued in connection with International Patent Application No. PCT/JP2021/023824, dated Aug. 23, 2022.

Office Action issued in corresponding Korean Patent Application No. 10-2023-7043433 dated Apr. 3, 2026.

PCT International Preliminary Report on Patentability, dated Dec. 28, 2023, which includes a Translation of International Searching Authority, “Written Opinion,” issued in connection with International Patent Application No. PCT/JP2022/023824, dated Aug. 23, 2022.

* cited by examiner

LITHIUM METAL COMPOSITE OXIDE, POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

CROSS-REFERENCE TO RELATED APPLICATIONS

The present application claims priority under 35 U.S.C. § 371 to International Patent Application No. PCT/JP2022/023824, filed Jun. 14, 2022, which claims priority to and the benefit of Japanese Patent Application No. 2021-100125, filed on Jun. 16, 2021. The contents of these applications are hereby incorporated by reference in their entireties.

TECHNICAL FIELD

The present invention relates to a lithium metal composite oxide, a positive electrode active material for a lithium secondary battery, a positive electrode for a lithium secondary battery, and a lithium secondary battery.

BACKGROUND ART

For positive electrode active materials used in the positive electrode of lithium secondary batteries, lithium metal composite oxides are used. The crystal shape and crystal structure of lithium metal composite oxide particles affect various battery characteristics.

Lithium metal composite oxides have specific crystal planes that can contribute to the desorption and insertion of lithium ions. When a lithium metal composite oxide with a crystal shape that has a large proportion of such crystal planes is used as a positive electrode active material, good battery characteristics are easily obtained.

It is also known that the phenomenon of cation mixing occurs in a lithium metal composite oxide with a layered rock-salt crystal structure.

Cation mixing means that a site that should be occupied by Li is occupied by a transition metal other than Li. Cation mixing is a phenomenon that results from the approximation of the ionic radii of lithium ions and transition metal ions. Here, the transition metal is, for example, Ni, Co, Mn, or the like.

A lithium metal composite oxide with a crystal structure that has a small proportion of cation mixing is filled with lithium ions, and therefore the capacity of the lithium secondary battery is unlikely to decrease.

As an attempt that focuses on the crystal shape and crystal structure of the lithium metal composite oxide, for example, Patent Literature 1 discloses a lithium nickel-containing composite oxide having primary particles with an octahedral shape and having a layered rock-salt crystal structure. Patent Literature 1 also discloses that the Li site occupancy at the 3a site of the layered rock-salt crystal structure is 96.0% or more, resulting in a small proportion of cation mixing. Patent Literature 1 discloses that such a lithium nickel-containing composite oxide improves the cycle characteristics of the lithium secondary battery.

CITATION LIST

Patent Literature

Patent Literature 1: JP-A-2017-226576

SUMMARY OF INVENTION

Technical Problem

The crystal shape and crystal structure of the lithium metal composite oxide affect various battery characteristics, and therefore, there is room for further investigation and improvement.

The present invention has been made in view of the above-described circumstances, and an object of the present invention is to provide a lithium metal composite oxide capable of obtaining a lithium secondary battery with high rate characteristics and cycle characteristics by focusing on the crystal shape and crystal structure of the lithium metal composite oxide. Another object of the present invention is to provide a positive electrode active material for a lithium secondary battery, a positive electrode for a lithium secondary battery, and a lithium secondary battery using the same.

Solution to Problem

One aspect of the present invention includes [1] to [9].

[1] A lithium metal composite oxide containing: a secondary particle which is an aggregate of primary particles; and a single particle which exists independently of the secondary particle, in which the lithium metal composite oxide has a layered rock-salt structure, is represented by Composition Formula (I) below, and satisfies (1) and (2) below.

$$Li_xNi_{1-y-z-w}Co_yMn_zX1_wO_2 \quad (I)$$

(Here, Composition Formula (I) satisfies $0.9\leq x\leq 1.2$, $0\leq y\leq 0.4$, $0\leq z\leq 0.4$, $0\leq w\leq 0.1$, and $y+z+w\leq 1$, and X1 represents one or more elements selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.)

$$1.20 \leq L_A/L_B < 1.60 \quad (1)$$

($L_A$ is a crystallite diameter obtained from a diffraction peak 1 within a range of $2\theta=18.8\pm1°$ and $L_B$ is a crystallite diameter obtained from a diffraction peak 2 within a range of $2\theta=38.3\pm1°$ in a diffraction peak obtained from powder X-ray diffraction using CuKα rays.)

(2): a Me occupancy at a lithium site in the layered rock-salt structure is 2.5% or less, as determined by analyzing the diffraction peaks by the Rietveld analysis method, and the Me is Ni, Co, Mn, or X1.

[2] The lithium metal composite oxide according to [1], in which z satisfies $0\leq z\leq 0.2$.

[3] The lithium metal composite oxide according to [1] or [2], in which a BET specific surface area is 1.0 $m^2/g$ or less.

[4] The lithium metal composite oxide according to any one of [1] to [3], in which the single particle has an average particle diameter of 2.0 μm or more and 10 μm or less.

[5] The lithium metal composite oxide according to any one of [1] to [4], in which (3) below is satisfied.

$$0.30 \leq P1/D_{50} \quad (3)$$

(P1 is an average particle diameter (μm) of the single particle, and $D_{50}$ is a 50% cumulative volume particle diameter (μm) of the lithium metal composite oxide, as obtained from a volume-based cumulative particle size distribution curve measured by a laser diffraction scattering method.)

[6] The lithium metal composite oxide according to any one of [1] to [5], in which $L_B$ is 1000 Å or less.

[7] A positive electrode active material for a lithium secondary battery, containing: the lithium metal composite oxide according to any one of [1] to [6].

[8] A positive electrode for a lithium secondary battery, containing: the positive electrode active material for the lithium secondary battery according to [7].

[9] A lithium secondary battery containing: the positive electrode for the lithium secondary battery according to [8].

Advantageous Effect of Invention

According to the present invention, it is possible to provide a lithium metal composite oxide capable of obtaining a lithium secondary battery with high rate characteristics and cycle characteristics.

DESCRIPTION OF EMBODIMENTS

Figure 1:
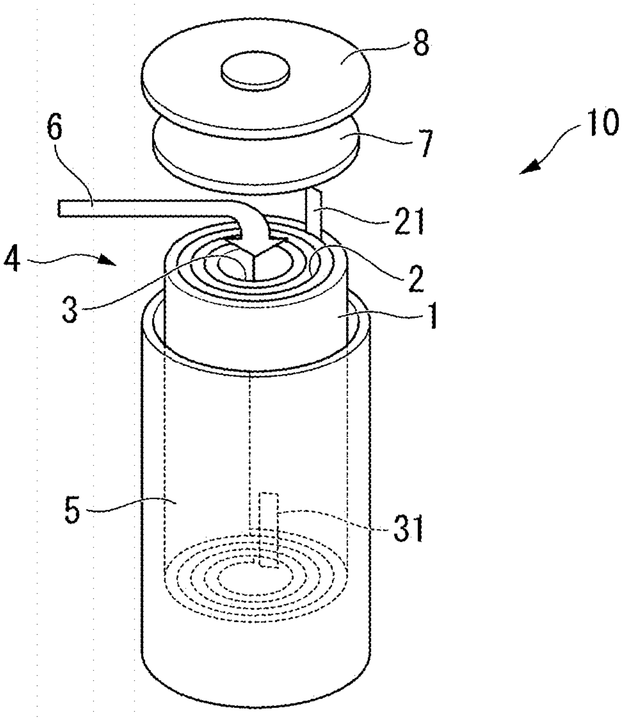
FIG. 1 is a schematic view showing an example of a lithium secondary battery.

The present invention is a lithium metal composite oxide contains a secondary particle which is an aggregate of primary particles and a single particle which exists independently of the secondary particle, in which the lithium metal composite oxide has a layered rock-salt structure, is represented by Composition Formula (I), and satisfies (1) and (2). The details will be described later.

In the present specification, a metal composite compound will be hereinafter referred to as "MCC".

A lithium metal composite oxide will be hereinafter referred to as "LiMO".

A positive electrode active material for a lithium secondary battery will be hereinafter referred to as "CAM" as an abbreviation for a cathode active material for a lithium secondary battery.

"Ni" refers not to a nickel metal but to a nickel atom. "Co", "Li", and the like also, similarly, each refer to a cobalt atom, a lithium atom, or the like.

For numerical ranges, "A or more and B or less" is indicated by "A to B". In a case where a numerical range is expressed as, for example, "1 to 10 m", this means a numerical range from 1 μm to 10 μm including the lower limit value (1 μm) and the upper limit value (10 μm), that is "1 μm or more and 10 μm or less".

In the present specification, the rate characteristics and cycle characteristics of a lithium secondary battery are measured by the following methods.

[Measurement of Rate Characteristics and Cycle Characteristics]

(Production of Positive Electrode for Lithium Secondary Battery)

LiMO of the present embodiment is used as CAM. A paste-like positive electrode mixture is prepared by kneading CAM, a conductive material, and a binder at CAM: conductive material:binder=92:5:3 (mass ratio). During the preparation of the positive electrode mixture, N-methyl-2-pyrrolidone is used as an organic solvent. Acetylene black is used as the conductive material. Polyvinylidene fluoride is used as the binder.

The obtained positive electrode mixture is applied to an Al foil having a thickness of m, which is to serve as a current collector, and dried in a vacuum at 150° C. for 8 hours, thereby obtaining a positive electrode for a lithium secondary battery. The positive electrode area of the positive electrode for the lithium secondary battery is set to 1.65 $cm^2$ (Production of Lithium Secondary Battery)

The following operation is carried out in a glove box under an argon atmosphere.

The positive electrode for the lithium secondary battery produced in the section (Production of positive electrode for lithium secondary battery) is placed on the lower lid of a part for a coin-type battery R2032 (manufactured by Hohsen Corp.) with the aluminum foil surface facing downward, and a separator (a polyethylene porous film) is placed on the positive electrode for the lithium secondary battery. An electrolytic solution (300 μl) is poured thereinto. The electrolytic solution used is a solution obtained by dissolving $LiPF_6$ in a liquid mixture of ethylene carbonate, dimethyl carbonate, and ethyl methyl carbonate in 30:35:35 (volume ratio) so as to reach a proportion of 1.0 mol/l.

Next, lithium metal is used as a negative electrode, and the negative electrode is placed on the upper side of the laminated film separator. An upper lid is placed through a gasket and caulked using a caulking machine, thereby producing a lithium secondary battery (coin-type half cell R2032).

Using the lithium secondary battery produced by the above method, rate characteristics and cycle characteristics are measured by the following methods.

(Rate Characteristics)

The "rate characteristics" refer to the ratio of the discharge capacity at 5 CA when the discharge capacity at 1 CA is defined as 100%. The higher this ratio, the higher output the battery exhibits, which is preferable for battery performance. In the present specification, for the "rate characteristics", the value obtained by performing a discharge rate test under the following conditions is evaluated as an index of discharge rate characteristics. In addition, "high rate characteristics" mean that the ratio of the discharge capacity obtained by the following method exceeds 85%.

(Discharge Rate Test)

Test temperature: 25° C.

Maximum charging voltage: 4.35 V, charging current: 1 CA, constant current constant voltage charging Minimum discharging voltage: 2.8 V, discharging current: 1 CA or 5 CA, constant current discharging Using the discharge capacity when performing constant current discharging at 1 CA and the discharge capacity when performing constant current discharging at 5 CA, the 5 CA/1 CA discharge capacity ratio determined by the following expression is used as an index of discharge rate characteristics.

$$(5CA/1\ CA\ \text{discharge capacity ratio})$$

$$5\ CA/1\ CA\ \text{discharge capacity ratio (\%)} = \text{discharge capacity at } 5\ CA\ (\text{mAh/g})/\text{discharge capacity at } 1\ CA(\text{mAh/g})\times 100$$

(Cycle Characteristics)

The "cycle characteristics" mean characteristics in which the battery capacity decreases due to repeated charging and discharging. In the present specification, the cycle retention rate, which is measured by the following method, is used as an index of cycle characteristics. In addition, "high cycle characteristics" mean that the cycle retention rate exceeds 85%.

First, the lithium secondary battery of the coin-type half cell is allowed to stand for 10 hours at room temperature to fully impregnate the separator and the positive electrode mixture layer with the electrolytic solution.

Next, initial charging and discharging is carried out by constant current constant voltage charging at room temperature with constant current charging at 0.5 CA to 4.35 V and then constant voltage charging at 4.35 V, followed by constant current discharging at 1 CA to 2.8 V.

The discharge capacity is measured and the value obtained is defined as the "initial discharge capacity" (mAh/g).

The charge capacity is measured and the value obtained is defined as the "initial charge capacity" (mAh/g).

After the initial charging and discharging, charging at 0.5 CA and discharging at 1 CA are repeated under the same conditions as the initial charging and discharging. After that, the discharge capacity at the 50th cycle (mAh/g) is measured.

The cycle retention rate is calculated according to the following expression from the initial discharge capacity and the discharge capacity at the 50th cycle. A higher cycle retention rate means that the decrease in battery capacity after repeated charging and discharging is suppressed, which is thus desirable for battery performance.

Cycle retention rate (%)=Discharge capacity at 50th cycle(mAh/g)/Initial discharge capacity(mAh/g)×100

<LiMO>

LiMO contains a secondary particle and a single particle.

In the present embodiment, a primary particle that does not aggregate and exists independently of the secondary particle is referred to as "single particle".

In the present embodiment, a primary particle that constitutes the secondary particle is referred to as "primary particle A". A primary particle that does not constitute the secondary particle is referred to as "single particle".

In the present specification, the "primary particle A" means a particle that has no grain boundary in appearance and constitutes the secondary particle. In more detail, the "primary particle A" means a particle that constitutes the secondary particle and has no clear grain boundary on the particle surface when the particle is observed in a visual field of 5000 times or more and 20000 times or less using a scanning electron microscope or the like.

In the present specification, the "secondary particle" means a particle in which a plurality of the primary particles A is combined in a three-dimensional manner. The secondary particle has a spherical or approximately spherical shape. The "secondary particle" is a particle that has a grain boundary in appearance.

Usually, the secondary particle is formed by aggregation of 10 or more of the primary particles A.

In the present specification, the "single particle" means a particle that has no grain boundary in appearance and does not constitute the secondary particle. In more detail, the "single particle" means a particle that exists independently of the secondary particle and has no clear grain boundary on the particle surface when the particle is observed in a visual field of 5000 times or more and 20000 times or less using a scanning electron microscope or the like.

In the present specification, in a case where two or more multiple particles are adjacent or overlap with each other, a particle that does not show a clear grain boundary on the particle surface and does not have a spherical or approximately spherical shape is regarded as "single particle".

It is preferable for LiMO to have a single particle content of 20% or more in all particles on a number basis. When LiMO having a single particle content of 20% or more in all particles is used as a positive electrode active material for a lithium secondary battery, the proportion of planes contributing to the desorption and insertion of lithium ions is likely to be large, and the conduction of lithium ions is likely to occur smoothly.

A LiMO having a single particle content of 20% or more in all particles means that the abundance of a particle with no grain boundary in one particle is large among all particles. In such LiMO, particles are unlikely to crack even when used as a positive electrode for a lithium secondary battery and subjected to repeated charging and discharging. When particles are unlikely to crack, it is easy to maintain conductive paths, and contact failures between particles and diffusion failures of lithium ion are unlikely to occur. Therefore, rate characteristics and cycle characteristics are unlikely to be deteriorated.

The average particle diameter of the single particle is preferably 2.0 μm or more, more preferably 2.2 μm or more, and still more preferably 3.0 μm or more. Also, the average particle diameter of the single particle is preferably 10 μm or less, more preferably 5.0 μm or less, and still more preferably 4.0 μm or less.

The upper limit value and lower limit value of the average particle diameter of the single particle can be randomly combined together.

The average particle diameter of the single particle is preferably 2.0 μm to 10 m, more preferably 2.2 μm to 5.0 m, and still more preferably 3.0 μm to 5.0 μm.

The average particle diameter of the secondary particle is preferably 3.0 μm or more, and more preferably 5.0 μm or more. Also, the average particle diameter of the secondary particle is preferably 15 μm or less, and more preferably 10 μm or less.

The upper limit value and lower limit value of the average particle diameter of the secondary particle can be randomly combined together.

The average particle diameter of the secondary particle is preferably 3.0 μm to 15 m, and more preferably 5.0 μm to 10 μm.

[Method for Measuring Average Particle Diameter of Single Particle and Secondary Particle]

The average particle diameter of the single particle and the secondary particle can be measured by the following method.

First, LiMO is placed on a conductive sheet attached onto a sample stage. Next, using a scanning electron microscope, LiMO is irradiated with electron beams at an acceleration voltage of 15 kV, and SEM observation is carried out.

As the scanning electron microscope, for example JSM-5510 manufactured by JEOL Ltd. can be used.

Next, from the obtained electron microscope image (SEM photograph), 50 or more single particles are extracted by the following method. At this time, particles for which no grain boundaries are observed in appearance are extracted as single particles. In a case where two or more multiple particles are adjacent or overlap with each other, particles that do not show clear grain boundaries on the particle surfaces and do not have a spherical or approximately spherical shape are regarded as single particles.

(Method for Extracting Single Particles)

When measuring the average particle diameter of the single particle, all of the single particles included in one visual field are to be measured. In a case where the number of single particles included in one visual field is less than 50, the measurement is performed until the total number of single particles included in multiple visual fields is 50 or more.

For the images of the extracted single particles, a rectangle circumscribed by a single particle is assumed, and the dimension of the rectangle in the longitudinal direction is regarded as the particle size of the single particle.

The arithmetic mean value of the particle sizes of the single particles obtained is the average particle diameter of the single particles contained in LiMO.

(Method for Extracting Secondary Particles)

When measuring the average particle diameter of the secondary particle, all of the secondary particles included in one visual field are to be measured. In a case where the number of secondary particles included in one visual field is less than 50, the measurement is performed until the total number of secondary particles included in multiple visual fields is 50 or more.

The average particle diameter of the secondary particle is measured by the same method as for the single particle.

[Method for Measuring Single Particle Content on Number Basis]

The single particle content on a number basis can be measured by observation using a scanning electron microscope (SEM). Specifically, first, after taking SEM photographs of one or more visual fields, the total number of particles (the total of single particles and secondary particles) and the number of single particles per entire visual field are counted.

Next, the ratio of the number of single particles (counts) to the total number of particles (counts) is determined as a percentage.

When taking SEM photographs of multiple visual fields, calculation of the number of single particles with respect to the total number of particles identified in the entire photograph in one visual field is carried out for 10 visual fields, and the average value of the content in each visual field is defined as the "single particle content" of the present invention.

<<Crystal Structure>>

LiMO has a layered rock-salt structure.

The layered rock-salt structure is a crystal structure in which lithium layers and transition metal layers other than lithium are alternately laminated with layers of oxygen therebetween. That is, the layered rock-salt structure is a crystal structure in which transition metal ion layers and lithium-only layers are alternately laminated via oxide ions. It is typically an $\alpha$-$NaFeO_2$-type crystal structure.

LiMO having such a crystal structure has a (003) plane, which is a plane where the desorption and insertion of lithium ions are difficult to take place, and a plane where the desorption and insertion of lithium ions take place well. The plane where the desorption and insertion of lithium ions take place well is a plane other than the (003) plane, such as a (012) plane and a (104) plane. When the (012) plane and the (104) plane can be exposed more to the electrolyte, the desorption and insertion of lithium ions can progress smoothly, and therefore, the battery characteristics are likely to be improved.

[Method for Confirming Crystal Structure]

The crystal structure of LiMO can be confirmed by observation using a powder X-ray diffraction measuring instrument.

For the powder X-ray diffraction measurement, an X-ray diffractometer, such as Ultima IV manufactured by Rigaku Corporation can be used.

<<Composition Formula>>

LiMO is represented by Composition Formula (I) below.

$$Li_xNi_{1-y-z-w}Co_yMn_zX1_wO_2 \quad (I)$$

(Here, Composition Formula (I) described above satisfies $0.9 \le x \le 1.2$, $0 \le y \le 0.4$, $0 \le z \le 0.4$, $0 \le w \le 0.1$, and $y+z+w \le 1$, and X1 represents one or more elements selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.)

(x)

In view of obtaining a lithium secondary battery with high cycle characteristics, x is preferably 0.9 or more, and more preferably 0.95 or more. In addition, in view of obtaining a lithium secondary battery with a higher initial coulombic efficiency, x is preferably 1.1 or less, and more preferably 1.05 or less.

The upper limit value and lower limit value of x can be randomly combined together.

The combination for x is, for example, $0.9 \le x \le 1.1$ and $0.95 \le x \le 1.05$.

(y)

In view of obtaining a lithium secondary battery with a low battery internal resistance, y is preferably 0.005 or more, more preferably 0.01 or more, and still more preferably 0.05 or more. In addition, in view of obtaining a lithium secondary battery with high thermal stability, y is preferably 0.4 or less, more preferably 0.35 or less, and still more preferably 0.33 or less.

The upper limit value and lower limit value of y can be randomly combined together.

The combination for y is, for example, $0.005 \le y \le 0.4$, $0.01 \le y \le 0.35$, $0.05 \le y \le 0.33$, and $0.005 \le y \le 0.15$.

(z)

In view of obtaining a lithium secondary battery with high cycle characteristics, z is preferably 0 or more, more preferably 0.01 or more, and still more preferably 0.02 or more.

In addition, in view of obtaining a lithium secondary battery with high storage characteristics at a high temperature (for example, under 60° C. environment), z is preferably 0.2 or less, more preferably 0.19 or less, and still more preferably 0.18 or less.

The upper limit value and lower limit value of z can be randomly combined together.

The combination for z is, for example, $0 \le z \le 0.2$, $0.01 \le z \le 0.19$, $0.02 \le z \le 0.18$, and $0 \le z \le 0.15$.

X1 is preferably one or more elements selected from the group consisting of Ti, Mg, Al, W, B, Zr, and Nb in view of obtaining a lithium secondary battery with high cycle characteristics, and preferably one or more elements selected from the group consisting of Al, W, B, Zr, and Nb in view of obtaining a lithium secondary battery with high thermal stability.

(w)

In view of obtaining a lithium secondary battery with high cycle characteristics, w is preferably 0.01 or more, more preferably 0.02 or more, and still more preferably 0.03 or more. In addition, in view of obtaining a lithium secondary battery with high storage characteristics at a high temperature (for example, under 60° C. environment), w is preferably 0.09 or less, more preferably 0.08 or less, and still more preferably 0.07 or less.

The upper limit value and lower limit value of w can be randomly combined together.

The combination for w is, for example, $0.01 \le w \le 0.09$, $0.02 \le w \le 0.08$, and $0.03 \le w \le 0.07$.

Examples of Composition Formula (I) described above include Composition Formula (i) below.

$$Li_xNi_{1-y-z-w}Co_yMn_zX1_wO_2 \quad (i)$$

(Here, Composition Formula (i) described above satisfies $0.9 \le x \le 1.1$, $0.005 \le y \le 0.15$, $0 \le z \le 0.15$, $0 \le w \le 0.1$, and $y+z+w \le 1$, and X1 is one or more elements selected from the group consisting of Ti, Mg, Al, W, B, Zr, and Nb.)

[Composition Analysis]

The composition analysis of LiMO can be measured using an ICP emission spectrometer after dissolving the obtained LiMO powder in hydrochloric acid.

As the ICP emission spectrometer, for example, SPS3000 manufactured by Seiko Instruments Inc. can be used.

(1)

LiMO satisfies (1) below.

$$1.20 \le L_A/L_B < 1.60 \quad (1)$$

($L_A$ is a crystallite diameter obtained from a diffraction peak 1 within a range of $2\theta=18.8\pm1°$ and $L_B$ is a crystallite diameter obtained from a diffraction peak 2 within a range of $2\theta=38.3\pm1°$ in a diffraction peak obtained from powder X-ray diffraction using CuKα rays.)

$L_A$ is the crystallite diameter of the (003) plane and $L_B$ is the crystallite diameter of the (012) plane.

[Method for Measuring $L_A$ and $L_B$]

The crystallite diameters, $L_A$ and $L_B$, can be measured by powder X-ray diffraction measurement.

The powder X-ray diffraction measurement may be carried out using an X-ray diffractometer, such as Ultima IV manufactured by Rigaku Corporation.

Specifically, first, a powder of LiMO is filled into a dedicated substrate, and the measurement is performed using a Cu-Kα ray source to obtain a powder X-ray diffraction pattern. An example of measurement conditions is described below.

(Measurement Conditions)

Diffraction angle $2\theta=100$ to 900

Sampling width 0.02°

Scan speed 4°/min

Using the integrated powder X-ray analysis software JADE, from the obtained powder X-ray diffraction pattern, the crystallite diameter $L_A$ obtained from a diffraction peak 1 within the range of $2\theta=18.8\pm10$ and the crystallite diameter $L_B$ obtained from a diffraction peak 2 within the range of $2\theta=38.3\pm1°$ are determined.

From the obtained $L_A$ and $L_B$, the ratio $L_A/L_B$ is determined.

LiMO preferably satisfies $1.21 \le L_A/L_B \le 1.59$, more preferably satisfies $1.22 \le L_A/L_B \le 1.55$, and still more preferably $1.22 \le L_A/L_B \le 1.50$.

As described above, the (012) plane is a plane where lithium ions can be desorbed and inserted.

When the ratio $L_A/L_B$ is the above-described upper limit value or less, it means that the proportion of the (012) plane to the (003) plane is large and that there are more planes where lithium ions can be desorbed and inserted. In this case, rate characteristics and cycle characteristics are easily improved.

When the ratio $L_A/L_B$ is the above-described lower limit value or more, it means that the particles have grown to an appropriate shape and size. As the crystal growth progresses, the crystal shape changes from a hexagonal planar shape to an octahedral shape. LiMO with a crystal shape being an octahedral shape allows lithium ions to move in and out more easily than LiMO with a hexagonal planar shape. On the other hand, as shown in Patent Literature 1, particles with an octahedral shape, in which particle growth has progressed significantly, are prone to contact failures between particles, resulting in a decrease in rate characteristics and cycle characteristics. In addition, such excessive growth of particles is likely to cause diffusion failures of lithium ions. Therefore, in LiMO having a ratio $L_A/L_B$ of the above-described lower limit value or more, the rate characteristics and cycle characteristics are unlikely to be deteriorated.

(1) specifies the ratio between the (003) plane and the (012) plane. As described above, the plane where the desorption and insertion of lithium ions take place well is a plane other than the (003) plane, such as the (012) plane and the (104) plane. In particular, the (012) plane is a plane that is likely to contribute to the desorption and insertion of lithium ions.

For example, it is known that, although the (104) plane can contribute to the desorption and insertion of lithium ions, segregation of Ni on the LiMO surface is likely to occur when the proportion of the (104) plane exposed on the surface increases.

The present inventors have focused on the crystallite diameter of the (012) plane among multiple crystal planes and have found that both cycle characteristics and rate characteristics can be achieved in a case where the ratio with the (003) plane satisfies a specific range.

The $L_B$ of LiMO is preferably 1000 Å or less, more preferably 980 Å or less, and still more preferably 950 Å or less. Also, the lower limit value of $L_B$ is, for example, 100 Å or more, 200 Å or more, or 300 Å or more.

The above-described upper limit value and lower limit value of $L_B$ can be randomly combined together. As examples of the combination, 100 Å≤$L_B$≤1000 Å, 200 Å≤$L_B$≤980 Å, 300 Å≤$L_B$≤950 Å, and 100 Å≤$L_B$≤950 Å are exemplary examples.

When the $L_B$ of LiMO is the above-described upper limit value or less, it means that the crystal growth of LiMO progresses moderately and the (012) plane is likely to appear on the particle surface.

(2)

LiMO satisfies (2) below.

(2): The Me occupancy at the lithium site in the layered rock-salt structure is 2.5% or less, preferably 2.0% or less, and still more preferably 1.7% or less, as determined by analyzing the diffraction peaks by the Rietveld analysis method.

Examples of the lower limit value of the Me occupancy at the lithium site include more than 0%, 0.1% or more, and 0.2% or more.

Examples of the Me occupancy at the lithium site include more than 0% and 2.5% or less, 0.1% to 2.0%, and 0.2% to 1.7%.

The Me is Ni, Co, Mn, or the above-described element X1.

(2) specifically means that n, the Me occupancy obtained from Rietveld analysis of powder X-ray diffraction, is 0.25 or less when LiMO is expressed as $(Li_{1-n}Me_n)(Me_{1-n}Li_n)O_2$.

LiMO satisfying (2) has a low occupancy rate by the Me, that is, a high occupancy rate of Li.

In such LiMO, the Me does not inhibit the transfer (desorption and insertion) of lithium ions during charging and during discharging, and therefore, the rate characteristics are unlikely to be deteriorated.

In addition, in LiMO satisfying (2), cation mixing does not progress, and therefore, the crystal structure is unlikely to be disordered and the layered rock-salt structure is easily maintained, thus making it difficult for the cycle characteristics to be deteriorated.

When cation mixing progresses, the structure is likely to change from the layered rock-salt type to the rock-salt type. In the rock-salt structure, cations are irregularly arranged, resulting in few diffusion paths of lithium ions, which is likely to deteriorate electrochemical characteristics such as rate characteristics and cycle characteristics.

[Rietveld Analysis Method]

The Me occupancy at the lithium site is obtained by carrying out Rietveld analysis by setting the Me occupancy in the layered rock-salt crystal structure to n and the Li occupancy rate to 1−n for the diffraction peaks obtained from the X-ray diffraction data. For the Rietveld analysis, TOPAS manufactured by Bruker can be used, for example.

(3)

LiMO preferably satisfies (3) below.

$$0.30 \leq P1/D_{50} \quad (3)$$

(P1 is the average particle diameter (μm) of the single particle, and $D_{50}$ is the 50% cumulative volume particle diameter (μm) of LiMO, as obtained from a volume-based cumulative particle size distribution curve measured by the laser diffraction scattering method.)

$P1/D_{50}$ is preferably 0.40 or more. $P1/D_{50}$ is preferably 1.40 or less, more preferably 1.30 or less, still more preferably 1.20 or less, and even still more preferably 1.10 or less.

As $P1/D_{50}$, $0.30 \leq P1/D_{50} \leq 1.40$ is preferable, $0.30 \leq P1/D_{50} \leq 1.30$ is more preferable, and $0.40 \leq P1/D_{50} \leq 1.20$ is still more preferable.

The larger the particle size of the secondary particle in LiMO, the smaller the value of $P1/D_{50}$. When $P1/D_{50}$ is 0.30 or more, the particle size of the secondary particle is not too large. Therefore, even when the primary particles in LiMO expand or contract due to the absorption reaction and desorption reaction of lithium ions caused by repeated charging and discharging of a lithium secondary battery, particle interfaces between the primary particles in LiMO are unlikely to crack and good cycle characteristics can be obtained.

[Method for Measuring Cumulative Volume Particle Diameter]

The "volume-based cumulative particle size distribution" can be measured by a measurement method using the laser diffraction scattering method as the measurement principle. The particle size distribution measurement using the laser diffraction scattering method as the measurement principle is referred to as "laser diffraction particle size distribution measurement".

Specifically, the cumulative particle size distribution of a metal composite hydroxide or LiMO, as described below, is measured by the following measuring method.

First, 0.1 g of a metal composite hydroxide or LiMO is injected into 50 ml of a 0.2 mass % sodium hexametaphosphate aqueous solution to obtain a dispersion liquid in which the metal composite hydroxide or LiMO is dispersed.

Next, the particle size distribution of the obtained dispersion liquid is measured using a laser diffraction scattering particle size distribution measuring device to obtain a volume-based cumulative particle size distribution curve. The measurement range of particle size distribution is 0.02 μm or more and 2000 μm or less.

As the laser diffraction scattering particle size distribution measuring device, for example, Microtrac MT3300EXII manufactured by MicrotracBEL Corp. can be used.

In the obtained cumulative particle size distribution curve, the value of the particle diameter at the point where the cumulative volume from the small particle side becomes 50% when the whole is 100% is defined as the 50% cumulative volume particle diameter $D_{50}$ (μm).

(4)

LiMO preferably has a BET specific surface area of 1.0 $m^2/g$ or less.

The lower limit of the BET specific surface area is preferably 0.20 $m^2/g$ or more, more preferably 0.30 $m^2/g$ or more, and particularly preferably 0.35 $m^2/g$ or more.

The upper limit of the BET specific surface area is preferably 0.99 $m^2/g$ or less, more preferably 0.90 $m^2/g$ or less, still more preferably 0.80 $m^2/g$ or less, and particularly preferably 0.70 $m^2/g$ or less.

The above-described upper limit and lower limit of the BET specific surface area can be randomly combined together.

Examples of the combination for the BET specific surface area are 0.20 $m^2/g$ to 0.99 $m^2/g$, 0.20 $m^2/g$ to 0.90 $m^2/g$, 0.30 $m^2/g$ to 0.80 $m^2/g$, and 0.35 $m^2/g$ to 0.70 $m^2/g$.

LiMO having a BET specific surface area of the above-described range is likely to improve conductivity, and thus is unlikely to deteriorate cycle characteristics.

[Method for Measuring BET Specific Surface Area]

The BET specific surface area can be measured by the following method.

It is measured by drying 1 g of LiMO in a nitrogen atmosphere at 105° C. for 30 minutes and using a BET specific surface area measuring device.

As the BET specific surface area measuring device, for example, Macsorb (registered trademark) manufactured by Mountech Co., Ltd. can be used.

<Method for Producing LiMO>

It is preferable that the method for producing LiMO includes a step of obtaining MCC and a step of obtaining LiMO. The step of obtaining MCC and the step of obtaining LiMO will be described below, in this order.

<<Step of Obtaining MCC>>

First, MCC containing metal elements other than Li, that is, Ni and optional metals, Co, Mn, and the element X1, is prepared.

Upon preparation of MCC, a metal composite hydroxide is first produced.

The obtained metal composite hydroxide is oxidized to obtain a metal composite oxide as MCC.

Usually, the metal composite hydroxide can be produced by the well-known batch co-precipitation method, semi-continuous (semi-batch) method, or continuous co-precipitation method. In the present embodiment, it is preferably produced by the semi-continuous method.

Hereinafter, the production method is described in detail, using as an example a metal composite hydroxide containing Ni, Co, and Mn as metals.

[Semi-Continuous Method]

The method for producing a metal composite hydroxide by the semi-continuous method will be described.

Specifically, nuclei of the metal composite hydroxide particles are first generated, and then the nuclei are allowed to grow.

Examples of the metal composite hydroxide include a metal composite hydroxide containing Ni, Co, and Al, and a metal composite hydroxide containing Ni, Co, and Mn.

In the case of producing a metal composite hydroxide containing Ni, Co, and Mn, examples of the metal raw material solution include a nickel salt solution, a cobalt salt solution, and a manganese salt solution.

In the case of producing a metal composite hydroxide containing Ni, Co, and Al, examples of the metal raw material solution include a nickel salt solution, a cobalt salt solution, and an aluminum salt solution.

Hereinafter, as an example, production of a metal composite hydroxide containing Ni, Co, and Mn as the metal composite hydroxide will be described. The metal composite hydroxide containing Ni, Co, and Mn is referred to as nickel cobalt manganese metal composite hydroxide in some cases.

[Nucleus Generation Step]

A metal raw material liquid mixture, a complexing agent, and an alkaline aqueous solution are reacted to generate a nucleus of a metal composite hydroxide represented by $Ni_{1-x-y}Co_xMn_y(OH)_2$. The metal raw material liquid mixture is a liquid mixture of a nickel salt solution, a cobalt salt solution, and a manganese salt solution.

A metal raw material liquid mixture, a complexing agent, and an alkaline aqueous solution are each continuously and simultaneously supplied to a reaction vessel equipped with a stirrer. This generates a nucleus.

In the semi-continuous method, in order to adjust the pH value of a liquid mixture containing the metal raw material liquid mixture and the complexing agent, the alkaline aqueous solution is added to the liquid mixture before the pH of the liquid mixture turns from alkaline into neutral. The alkaline aqueous solution used can be sodium hydroxide or potassium hydroxide. Also, the complexing agent is a compound capable of forming a complex with a nickel ion and a cobalt ion in an aqueous solution, Examples of the complexing agent include an ammonium ion donor, hydrazine, ethylenediaminetetraacetic acid, nitrilotriacetic acid, uracildiacetic acid, and glycine. As the ammonium ion donor, ammonium salts such as ammonium hydroxide, ammonium sulfate, ammonium chloride, ammonium carbonate, and ammonium fluoride can be used.

The value of the pH in the present specification is defined as a value measured when the temperature of the liquid mixture is 40° C. The pH of the liquid mixture is measured when the temperature of the liquid mixture sampled from a reaction vessel reaches 40° C.

In a case where the temperature of the sampled liquid mixture is lower than 40° C., the liquid mixture is heated and the pH is measured when the temperature reaches 40° C. In a case where the temperature of the sampled liquid mixture is higher than 40° C., the liquid mixture is cooled and the pH is measured when the temperature reaches 40° C.

At the time of the reaction, the temperature of the reaction vessel is controlled within the range of, for example, 20° C. to 80° C., preferably 30° C. to 70° C.

In addition, in the nucleus generation step, the pH value in the reaction vessel is controlled within the range of, for example, pH 10 to pH 13, preferably pH 11 to pH 13.

In the nucleus generation step, the substances in the reaction vessel are stirred and mixed together.

To give an example of the stirring rotation speed, the stirring rotation speed is preferably more than 1000 rpm, more preferably 1100 rpm or more, and still more preferably 11500 rpm or more. By stirring under such stirring conditions, each raw material liquid supplied is easily mixed uniformly.

In the nucleus generation step, the concentration of the complexing agent in the reaction vessel is controlled within the range of, for example, 0.1 g/L to 15.0 g/L, preferably 1.0 g/L to 12.0 g/L.

After a certain amount of time has elapsed from the initiation of the nucleus generation step, the various conditions are changed to the reaction conditions for a nucleus growth step, as described below. It is preferable that the above-described certain amount of time is appropriately adjusted depending on the feed rate of raw material liquid and the slurry concentration in the reaction vessel. In general, 0.1 hours to 10 hours is preferable.

[Nucleus Growth Step]

After the nucleus generation step is terminated, the metal raw material liquid mixture, the complexing agent, and the alkaline aqueous solution are each continuously supplied to the same reaction vessel in which the nucleus generation step was performed. This allows the nucleus to grow.

The concentration of the complexing agent in the reaction vessel in the nucleus growth step is preferably in the same range as in the nucleus generation step, and the pH in the nucleus growth step is controlled within the range of, for example, pH 9 to 12, preferably pH 9 to 11.5.

In the nucleus growth step, it is preferable that the substances in the reaction vessel are stirred and mixed together under the same stirring conditions as for the nucleus generation step.

For the reaction vessel, a reaction vessel is used in which the generated nucleus is caused to overflow for separation. The generated nucleus is caused to overflow from the reaction vessel, and settles and concentrates in a settling tank connected to the overflow tube. The concentrated nucleus-containing slurry is returned to the reaction vessel, where the nucleus is allowed to grow again.

In the nucleus growth step, the nucleus-containing slurry in the reaction vessel is sampled as appropriate, and when the desired physical properties are achieved, the supply of the metal raw material liquid mixture, complexing agent, and alkaline aqueous solution is stopped. The slurry in the reaction vessel at the point when the supply of each liquid is stopped is a slurry containing the target nickel cobalt manganese metal composite hydroxide.

By the above-described step, a slurry containing the nickel cobalt manganese metal composite hydroxide is obtained as the metal composite hydroxide-containing slurry.

[Dehydration Step]

After the reaction described above, the obtained slurry containing the nickel cobalt manganese metal composite hydroxide is washed and then dried to obtain a metal composite hydroxide as the nickel cobalt manganese metal composite hydroxide.

When isolating the metal composite hydroxide, a method is preferable in which the metal composite hydroxide-containing slurry is dehydrated by centrifugation, suction filtration, or the like.

The metal composite hydroxide obtained by the dehydration is preferably washed with water or a washing liquid containing alkali. In the present embodiment, the metal composite hydroxide is preferably washed with a washing liquid containing alkali, and more preferably washed with a sodium hydroxide solution.

[Drying Step]

The metal composite hydroxide obtained by the above-described dehydration step is dried in the air atmosphere under conditions of 105° C. to 200° C. for 1 hour to 20 hours.

[Continuous Co-Precipitation Method]

The metal composite hydroxide can also be produced by using the continuous co-precipitation method.

Specifically, a method in which the metal composite hydroxide is produced by the continuous co-precipitation method disclosed in JP-A-2002-201028 is an exemplary example.

In a case where the metal composite hydroxide is produced by the continuous co-precipitation method, the same raw material liquid, alkali, and complexing agent as for the semi-continuous method are preferably used. In addition, at the time of the reaction, the pH value in the reaction vessel is set within the range of 9 to 13, for example, and preferably controlled within the range of the set pH value ±0.03.

As the reaction vessel that is used in the continuous co-precipitation method, it is possible to use a reaction vessel in which the formed reaction precipitate is caused to overflow for separation.

When the concentration of the metal salts to be supplied to the reaction vessel, reaction temperature, reaction pH, and the like are appropriately controlled, it is possible to control the physical properties of the metal composite hydroxide to be obtained within the desired ranges.

By the above-described step, a slurry containing the nickel cobalt manganese metal composite hydroxide is obtained as the metal composite hydroxide-containing slurry. For the dehydration step and drying step, the same methods as for the semi-continuous method are preferably used.

[Pulverization and Classification Step]

If necessary, by carrying out pulverization and classification of the obtained nickel cobalt manganese metal composite hydroxide, the particle size distribution $(D_{H90}-D_{H10})/D_{H50}$ of the resulting metal composite hydroxide can also be adjusted. $D_{H50}$ is the value of the particle diameter at the point where the cumulative volume from the small particle side becomes 50% when the whole is 100% in the volume-based cumulative particle size distribution curve obtained by the laser diffraction particle size distribution measurement described above, $D_{H10}$ is the value of the particle diameter at the point where the cumulative volume becomes 10%, and $D_{H90}$ is the value of the particle diameter at the point where the cumulative volume becomes 90%.

The metal composite hydroxide preferably has a particle size distribution in which $D_{H50}$, $D_{H10}$, and $D_{H90}$ satisfy the following expression:

$$(D_{H90}-D_{H10})/D_{H50}\leq 1.0.$$

A metal composite hydroxide that satisfies the above-described particle size distribution is likely to react uniformly with a lithium compound. In this case, cation mixing is unlikely to occur and it is easy to produce LiMO that satisfies (2) above.

Next, by oxidizing the nickel cobalt manganese metal composite hydroxide, a nickel cobalt manganese metal composite oxide, which is the metal composite oxide, is prepared.

Specifically, it is preferable to oxidize the nickel cobalt manganese metal composite hydroxide by heating. The heating temperature for the oxidization is preferably 400° C. to 700° C. and more preferably 450° C. to 680° C. If necessary, a plurality of heating steps may be carried out.

When heating the metal composite hydroxide at a temperature of higher than 700° C., oxidation is likely to progress excessively and the transition metal is likely to be irregularly arranged. When such a metal composite oxide is mixed with a lithium compound and calcined, cation mixing is likely to progress.

On the other hand, a metal composite oxide produced by heating at a temperature of 700° C. or lower is likely to have a crystal structure in which the transition metal is regularly arranged. When such a metal composite oxide is mixed with a lithium compound and calcined, cation mixing is unlikely to occur, making it easy to produce LiMO that satisfies (2) above.

The holding time for the oxidization is, for example, 0.1 hours to 20 hours, and preferably 0.5 hours to 10 hours. The temperature rising rate up to the above-described heating temperature is, for example, 50° C./hour to 400° C./hour, and the temperature decrease rate from the above-described heating temperature to room temperature is, for example, 10° C./hour to 400° C./hour. In addition, as the heating atmosphere, it is possible to use air, oxygen, nitrogen, argon or a gas mixture thereof.

The inside of the heating device may be under an appropriate oxygen-containing atmosphere. The oxidizing atmosphere may be an oxygen-containing atmosphere formed by mixing an oxidizing gas into an inert gas or an oxidizing agent may be present in an inert gas atmosphere. When the inside of the heating device is an appropriate oxidizing atmosphere, a transition metal that is contained in the metal composite hydroxide is appropriately oxidized, which makes it easy to control the form of the metal composite oxide.

As oxygen or the oxidizing agent in the oxidizing atmosphere, a sufficient number of oxygen atoms need to be present in order to oxidize the transition metal.

In a case where the oxidizing atmosphere is an oxygen-containing atmosphere, the atmosphere in the reaction vessel can be controlled by a method in which an oxidizing gas is aerated into the reaction vessel, a method in which an oxidizing gas is bubbled through the liquid mixture, or the like.

As the oxidizing agent, it is possible to use a peroxide such as hydrogen peroxide, a peroxide salt such as permanganate, perchlorate, hypochlorite, nitric acid, halogen, ozone, or the like.

<<Step of Obtaining LiMO>>

The metal composite oxide obtained by the above-described method is mixed with a lithium compound to obtain a mixture of the metal composite oxide and the lithium compound.

As the lithium compound, one or more selected from the group consisting of lithium carbonate, lithium hydroxide, and lithium hydroxide monohydrate can be used.

The lithium compound and the metal composite oxide are mixed in consideration of the composition ratio of a final target product to obtain a mixture. Specifically, it is preferable that the lithium compound and the metal composite oxide are mixed at ratios corresponding to the composition ratio of Composition Formula (I).

In the present embodiment, it is also preferable to mix an inert melting agent at the same time when mixing the metal composite oxide and the lithium compound.

By calcining a mixture containing the metal composite oxide, the lithium compound, and the inert melting agent, the mixture of the metal composite oxide and the lithium compound is calcined in the presence of the inert melting agent.

By calcining the mixture of the metal composite oxide and the lithium compound in the presence of the inert melting agent, secondary particles in which the primary particles A are sintered to each other are unlikely to be generated. In addition, the growth of single particles can be promoted.

Also, by calcining the mixture of the metal composite oxide and the lithium compound in the presence of the inert melting agent described below, the particles easily grow and LiMO that satisfies (1) can be produced.

When the mixture of the metal composite oxide and the lithium compound is calcined, LiMO is obtained. Dry air, an oxygen atmosphere, an inert atmosphere, or the like is used for the calcining. Also, the calcining step may have a plurality of calcining stages that is carried out at different calcining temperatures. For example, it may have a first calcining stage and a second calcining stage of calcining at a higher temperature than in the first calcining stage. Furthermore, the calcining step may have calcining stages that are carried out at different calcining temperatures and for different calcining times.

In the present specification, the calcining temperature means the temperature of the atmosphere in a calcining furnace and is the highest temperature of the holding temperatures in the main calcining step. The "highest temperature of the holding temperatures" will be hereinafter referred to as "highest holding temperature" in some cases. In a case where the main calcining step has a plurality of heating steps, the calcining temperature means the temperature at which heating is performed at the highest holding temperature among individual heating step.

As for the calcining time, the total time from the initiation of temperature rise until the highest holding temperature is reached and temperature holding is terminated is preferably 1 hour or longer and 30 hours or shorter. The temperature rising rate in the calcining step until the highest holding temperature is reached is usually 50° C./hour to 400° C./hour, and the temperature decrease rate from the above-described holding temperature to room temperature is usually 10° C./hour to 400° C./hour. In particular, the temperature rising rate is preferably 80° C./hour or faster, more preferably 100° C./hour or faster, and particularly preferably 150° C./hour or faster. The temperature rising rate is calculated from the time taken while the temperature begins to be raised and then reaches the highest holding temperature in the calcining device, and the temperature difference between the temperature at the initiation of the temperature rise and the highest holding temperature in the calcining furnace of the calcining device.

When the holding temperature in the calcining is adjusted, it is possible to control the particle size of the single particle in LiMO to be obtained in the preferable range of the present embodiment.

Usually, as the holding temperature becomes higher, there is a tendency that the particle size of the single particle becomes larger and the BET specific surface area becomes smaller. The holding temperature in the calcining may be appropriately adjusted depending on the kind of a transition metal element used and the kinds and amounts of a precipitant and the inert melting agent.

The holding temperature may be set in consideration of the melting point of the inert melting agent, which will be described below, and is preferably set in the range of [melting point of inert melting agent −200° C.] or higher and [melting point of inert melting agent +200° C.] or lower.

The holding temperature can be specifically in the range of 200° C. to 1150° C., for example, and is preferably 300° C. to 1050° C., and more preferably 500° C. to 1000° C.

Also, the time for holding at the holding temperature is, for example, 0.1 hours to 20 hours, and preferably 0.5 hours to 10 hours. In addition, as the calcining atmosphere, it is possible to use air, oxygen, nitrogen, argon or a gas mixture thereof.

For the above-described calcining, commercially available products of the inert melting agent may be used.

In the present embodiment, examples of the inert melting agent include one or more selected from the group consisting of fluorides of one or more elements selected from the group consisting of Na, K, Rb, Cs, Ca, Mg, Sr, and Ba (hereinafter, referred to as "A"), chlorides of A, carbonates of A, sulfates of A, nitrates of A, phosphates of A, molybdates of A, and tungstates of A.

As the fluorides of A, NaF (melting point: 993° C.), KF (melting point: 858° C.), RbF (melting point: 795° C.), CsF (melting point: 682° C.), $CaF_2$ (melting point: 1402° C.), $MgF_2$ (melting point: 1263° C.), $SrF_2$ (melting point: 1473° C.), and $BaF_2$ (melting point: 1355° C.) can be exemplary examples.

As the chlorides of A, NaCl (melting point: 801° C.), KCl (melting point: 770° C.), RbCl (melting point: 718° C.), CsCl (melting point: 645° C.), $CaCl_2$ (melting point: 782° C.), $MgCl_2$ (melting point: 714° C.), $SrCl_2$ (melting point: 857° C.), and $BaCl_2$ (melting point: 963° C.) can be exemplary examples.

As the carbonates of A, $Na_2CO_3$ (melting point: 854° C.), $K_2CO_3$ (melting point: 899° C.), $Rb_2CO_3$ (melting point: 837° C.), $Cs_2CO_3$ (melting point: 793° C.), $CaCO_3$ (melting point: 825° C.), $MgCO_3$ (melting point: 990° C.), $SrCO_3$ (melting point: 1497° C.), and $BaCO_3$ (melting point: 1380° C.) can be exemplary examples.

As the sulfates of A, $Na_2SO_4$ (melting point: 884° C.), $K_2SO_4$ (melting point: 1069° C.), $Rb_2SO_4$ (melting point: 1066° C.), $Cs_2SO_4$ (melting point: 1005° C.), $CaSO_4$ (melting point: 1460° C.), $MgSO_4$ (melting point: 1137° C.), $SrSO_4$ (melting point: 1605° C.), and $BaSO_4$ (melting point: 1580° C.) can be exemplary examples.

As the nitrates of A, $NaNO_3$ (melting point: 310° C.), $KNO_3$ (melting point: 337° C.), $RbNO_3$ (melting point: 316° C.), $CsNO_3$ (melting point: 417° C.), $Ca(NO_3)_2$ (melting point: 561° C.), $Mg(NO_3)_2$, $Sr(NO_3)_2$ (melting point: 645° C.), and $Ba(NO_3)_2$ (melting point: 596° C.) can be exemplary examples.

As the phosphates of A, $Na_3PO_4$, $K_3PO_4$ (melting point: 1340° C.), $Rb_3PO_4$, $Cs_3PO_4$, $Ca_3(PO_4)_2$, $Mg_3(PO_4)_2$, (melting point: 1184° C.), $Sr_3(PO_4)_2$ (melting point: 1727° C.), and $Ba_3(PO_4)_2$ (melting point: 1767° C.) can be exemplary examples.

As the molybdates of A, $Na_2MoO_4$ (melting point: 698° C.), $K_2MoO_4$ (melting point: 919° C.), $Rb_2MoO_4$ (melting point: 958° C.), $Cs_2MoO_4$ (melting point: 956° C.), $CaMoO_4$ (melting point: 1520° C.), $MgMoO_4$ (melting point: 1060° C.), $SrMoO_4$ (melting point: 1040° C.), and $BaMoO_4$ (melting point: 1460° C.) can be exemplary examples.

As the tungstates of A, $Na_2WO_4$ (melting point: 687° C.), $K_2WO_4$, $Rb_2WO_4$, $Cs_2WO_4$, $CaWO_4$, $MgWO_4$, $SrWO_4$, and $BaWO_4$ can be exemplary examples.

In the present embodiment, it is also possible to use two or more of these inert melting agents. In the case of using two or more inert melting agents, there are also cases where the melting point of the inert melting agents as a whole decreases.

In addition, among these inert melting agents, as an inert melting agent for obtaining a lithium metal composite oxide with higher crystallinity, one or more salts selected from the group consisting of the carbonates of A, the sulfates of A, and the chlorides of A are preferable.

Also, A is preferably any one or both of sodium (Na) and potassium (K).

That is, among the above-described inert melting agents, a particularly preferable inert melting agent is one or more selected from the group consisting of NaCl, KCl, $Na_2CO_3$, $K_2CO_3$, $Na_2SO_4$, and $K_2SO_4$, and it is more preferable to use any one or both of $K_2SO_4$ and $K_2CO_3$.

Regarding the amount of the inert melting agent used during the calcining, the proportion of the mole number of the inert melting agent to the total mole number of the lithium compound and the inert melting agent is preferably 0.06 to 30, more preferably 0.10 to 20, and still more preferably 0.10 to 15. When the amount of the inert melting agent used is in the above-described range, LiMO that satisfies (1) can be produced.

Also, in a case where crystal growth is arbitrarily accelerated, an inert melting agent other than the inert melting agents listed above may be used in combination. Examples of such an inert melting agent include ammonium salts such as $NH_4Cl$ and $NH_4F$.

The inert melting agent may remain in LiMO after the calcining or may be removed by washing with water or an alcohol, for example, after the calcining. It is preferable that LiMO after the calcining is washed with water or an alcohol.

<CAM>

LiMO produced by the production method of the present embodiment can be suitably used as CAM.

CAM of the present embodiment contains LiMO. CAM may contain LiMO other than the present invention as long as the effects of the present invention are not impaired.

<Lithium Secondary Battery>

The configuration of a lithium secondary battery that is suitable in a case where LiMO produced by the production method of the present embodiment is used as CAM will be described.

Furthermore, a positive electrode for a lithium secondary battery that is suitable in a case where LiMO produced by the production method of the present embodiment is used as CAM will be described. The positive electrode for a lithium secondary battery will be hereinafter referred to as positive electrode in some cases.

Furthermore, a lithium secondary battery that is suitable for an application of a positive electrode will be described.

An example of the lithium secondary battery that is suitable in a case where LiMO produced by the production method of the present embodiment is used as CAM has a positive electrode, a negative electrode, a separator interposed between the positive electrode and the negative electrode, and an electrolytic solution disposed between the positive electrode and the negative electrode.

An example of the lithium secondary battery has a positive electrode, a negative electrode, a separator interposed between the positive electrode and the negative electrode, and an electrolytic solution disposed between the positive electrode and the negative electrode.

FIG. 1 is a schematic view showing an example of a lithium secondary battery. For example, a cylindrical lithium secondary battery 10 is produced as described below.

First, as shown in FIG. 1, a pair of separators 1 having a strip shape, a strip-shaped positive electrode 2 having a positive electrode lead 21 at one end, and a strip-shaped negative electrode 3 having a negative electrode lead 31 at one end are laminated in the order of the separator 1, the positive electrode 2, the separator 1, and the negative electrode 3 and are wound to form an electrode group 4.

Next, the electrode group 4 and an insulator, not shown, are accommodated in a battery can 5, and the can bottom is then sealed. The electrode group 4 is impregnated with an electrolytic solution 6, and an electrolyte is disposed between the positive electrode 2 and the negative electrode 3. Furthermore, the upper portion of the battery can 5 is sealed with a top insulator 7 and a sealing body 8, whereby the lithium secondary battery 10 can be produced.

As the shape of the electrode group 4, for example, a columnar shape in which the cross-sectional shape becomes a circle, an ellipse, a rectangle, or a rectangle with rounded corners when the electrode group 4 is cut in a direction perpendicular to the winding axis can be an exemplary example.

In addition, as a shape of the lithium secondary battery having the electrode group 4, a shape specified by IEC60086, which is a standard for a battery specified by the International Electrotechnical Commission (IEC), or by JIS C 8500 can be adopted. For example, shapes such as a cylindrical type and a square type can be exemplary examples.

Furthermore, the lithium secondary battery is not limited to the winding-type configuration and may have a laminate-type configuration in which the laminated structure of the positive electrode, the separator, the negative electrode, and the separator is repeatedly overlaid. As the laminate-type lithium secondary battery, a so-called coin-type battery, button-type battery, or paper-type (or sheet-type) battery can be an exemplary example.

Hereinafter, each configuration will be described in order.

(Positive Electrode)

The positive electrode can be produced by, first, preparing a positive electrode mixture containing CAM, a conductive material, and a binder and supporting the positive electrode mixture by a positive electrode current collector.

(Negative Electrode)

The negative electrode in the lithium secondary battery needs to be a material which can be doped with lithium ions and from which lithium ions can be de-doped at a potential lower than that of the positive electrode. For example, an electrode in which a negative electrode mixture containing a negative electrode active material is supported by a negative electrode current collector and an electrode formed of a negative electrode active material can be exemplary examples.

For the positive electrode, separator, negative electrode, and electrolytic solution that configure the lithium secondary battery, the configuration, materials, and production method disclosed in [0113] to [0140] of WO2022/113904A1, for example, can be used.

<All-Solid-State Lithium Secondary Battery>

Next, a positive electrode for which LiMO produced by the production method of the present embodiment is used as CAM of an all-solid-state lithium secondary battery and an all-solid-state lithium secondary battery having this positive electrode will be described while describing the configuration of an all-solid-state lithium secondary battery.

Figure 2:
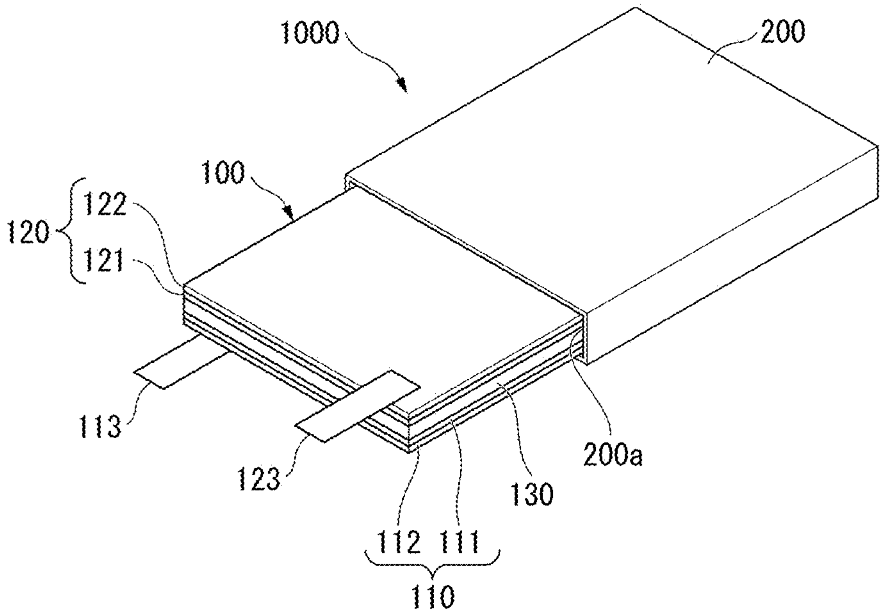
FIG. 2 is a schematic view showing an example of an all-solid-state lithium secondary battery.

FIG. 2 is a schematic view showing an example of an all-solid-state lithium secondary battery. An all-solid-state lithium secondary battery 1000 shown in FIG. 2 has a laminate 100 having a positive electrode 110, a negative electrode 120, and a solid electrolyte layer 130 and an exterior body 200 accommodating the laminate 100. In addition, the all-solid-state lithium secondary battery 1000 may have a bipolar structure in which CAM and a negative electrode active material are disposed on both sides of a current collector. As specific examples of the bipolar structure, for example, the structures disclosed in JP-A-2004-95400 are exemplary examples. A material that configures each member will be described below.

The laminate 100 may have an external terminal 113 that is connected to a positive electrode current collector 112 and an external terminal 123 that is connected to a negative electrode current collector 122. In addition, the all-solid-state lithium secondary battery 1000 may have a separator between the positive electrode 110 and the negative electrode 120.

The all-solid-state lithium secondary battery 1000 further has an insulator, not shown, that insulates the laminate 100 and the exterior body 200 from each other and a sealant, not shown, that seals an opening portion 200*a* of the exterior body 200.

As the exterior body 200, a container formed of a highly corrosion-resistant metal material such as aluminum, stainless steel or nickel-plated steel can be used. In addition, as the exterior body 200, a container obtained by processing a laminate film having at least one surface on which a corrosion resistant process has been performed into a bag shape can also be used.

As the shape of the all-solid-state lithium secondary battery 1000, for example, shapes such as a coin type, a button type, a paper type (or a sheet type), a cylindrical type, a square type, and a laminate type (pouch type) can be exemplary examples.

As an example of the all-solid-state lithium secondary battery 1000, a form in which one laminate 100 is provided is shown in the drawings, but the present embodiment is not limited thereto. The all-solid-state lithium secondary battery 1000 may have a configuration in which the laminate 100 is used as a unit cell and a plurality of unit cells (laminates 100) is sealed inside the exterior body 200.

(Positive Electrode)

The positive electrode 110 has a positive electrode active material layer 111 and a positive electrode current collector 112.

The positive electrode active material layer 111 contains the above-described CAM and a solid electrolyte. In addition, the positive electrode active material layer 111 may contain a conductive material and a binder.

(Negative Electrode)

The negative electrode 120 has a negative electrode active material layer 121 and the negative electrode current collector 122. The negative electrode active material layer 121 contains a negative electrode active material. In addition, the negative electrode active material layer 121 may contain a solid electrolyte and a conductive material. As the negative electrode active material, the negative electrode current collector, the solid electrolyte, the conductive material, and a binder, those described above can be used.

For the all-solid-state lithium secondary battery, the configuration, materials, and production method disclosed in [0151] to [0181] of WO2022/113904A1, for example, can be used.

Since LiMO of the present embodiment has a predetermined crystal structure and crystal shape, the rate characteristics and cycle characteristics of the lithium secondary battery can be improved. The reason for this is considered to be that having a predetermined crystal structure makes it easy to maintain the crystal structure even when charging and discharging are repeated, and thus the cycle retention rate is unlikely to decrease. It is also considered that having a predetermined crystal shape provides a large desorption plane and insertion plane for lithium ions, and therefore, the rate characteristic is unlikely to be deteriorated.

The present invention includes [10] to [18] below.

[10] LiMO containing: a secondary particle which is an aggregate of primary particles; and a single particle which exists independently of the secondary particle, in which LiMO has a layered rock-salt structure, is represented by Composition Formula (I), and satisfies (1) and (2) below.

$$1.22 \leq L_A/L_B \leq 1.50 \tag{1}$$

(2): the Me occupancy at the lithium site is more than 0% and 2.0% or less.

[11] LiMO according to [10], in which z in Composition Formula (I) satisfies $0 \leq z \leq 0.15$.

[12] LiMO according to [10] or [11], in which the BET specific surface area is 0.20 $m^2/g$ or more and 0.90 $m^2/g$ or less.

[13] LiMO according to any one of [10] to [12], in which the single particle has the average particle diameter of 2.2 μm or more and 4.0 μm or less.

[14] LiMO according to any one of [10] to [13], in which (3) below is satisfied.

$$0.30 \leq P1/D_{50} \leq 1.10 \tag{3}$$

[15] LiMO according to any one of [10] to [14], in which $L_B$ satisfies 100 Å≤$L_B$≤950 Å.

[16] LiMO in which Composition Formula (I) is Composition Formula (i).

[17] CAM, containing: LiMO according to any one of [10] to [16].

[18] A positive electrode for a lithium secondary battery, containing: CAM according to [17].

[18] A lithium secondary battery containing the positive electrode for the lithium secondary battery according to [17].

EXAMPLES

Next, the present invention will be described in further detail by means of Examples.

<Composition Analysis>

The composition analysis of LiMO was performed by the method described in the above-described section [Compositional analysis].

<Method for Measuring Average Particle Diameter of Single Particle>

The average particle diameter of the single particle in LiMO was measured by the method described in the above-described section [Method for measuring average particle diameter of single particle and secondary particle].

<Method for Measuring Single Particle Content on Number Basis>

The single particle content of LiMO on a number basis was measured by the method described in the above-described section [Method for measuring single particle content on number basis].

<Method for Confirming Crystal Structure>

The crystal structure of LiMO was confirmed by the method described in the above-described section [Method for confirming crystal structure].

<Method for Measuring $L_A$ and $L_B$>

$L_A$ and $L_B$ of LiMO were measured by the method described in the above-described section [Method for measuring $L_A$ and $L_B$]. From the obtained $L_A$ and $L_B$, the ratio $L_A/L_B$ was calculated.

<Measurement of Me Occupancy>

The Me occupancy at the lithium site in LiMO was measured by the method described in the above-described section [Rietveld analysis method].

<Method for Measuring Cumulative Volume Particle Diameter>

The cumulative volume particle diameter of the metal composite hydroxide and LiMO was measured by the method described in the above-described section [Method for measuring cumulative volume particle diameter]. From the obtained $D_{H10}$, $D_{H50}$, and $D_{H90}$ of the metal composite hydroxide, $(D_{H90}-D_{H10})/D_{H50}$ was calculated.

<Calculation of $P1/D_{50}$>

From the average particle diameter of the single particle, P1, and the 50% cumulative volume particle diameter $D_{50}$ of LiMO, obtained by the methods described above, $P1/D_{50}$ was determined.

<Method for Measuring BET Specific Surface Area>

The BET specific surface area of LiMO was determined by the above-described section [Method for measuring BET specific surface area].

<Measurement of Rate Characteristics and Cycle Characteristics of Lithium Secondary Battery>

The rate characteristics and cycle characteristics of the lithium secondary battery were measured by the methods described in the above-described section [Measurement of rate characteristics and cycle characteristics].

Example 1

[Nucleus Generation Step]

Using a reaction vessel equipped with a stirrer and an overflow pipe, a concentration tank connected to the overflow pipe, and a device having a mechanism for carrying out circulation from the concentration tank to the reaction vessel, water was put into the reaction vessel, then, an aqueous solution of sodium hydroxide was added, and the liquid temperature was held at 50° C.

A nickel sulfate aqueous solution and a cobalt sulfate aqueous solution were mixed together at such a proportion that the atomic ratio between Ni and Co was 0.89:0.11 to prepare a metal raw material liquid mixture.

Next, 3 g of ammonium sulfate crystals as a complexing agent with respect to a volume of 1 L of the reaction vessel were injected into the reaction vessel, and the concentration of the complexing agent in the reaction vessel was adjusted to 3 g/L. Under stirring, the metal raw material liquid mixture and the ammonium sulfate aqueous solution as a complexing agent were continuously added.

An aqueous solution of sodium hydroxide was timely added dropwise such that the pH of the solution in the reaction vessel reached 11.5 (measurement temperature: 40° C.).

[Nucleus Growth Step]

Subsequently, an aqueous solution of sodium hydroxide was timely added dropwise such that the pH of the solution in the reaction vessel reached 11.2 (measurement temperature: 40° C.). After 33 hours had elapsed from the initiation of the nucleus growth step, all liquid feeds were stopped and the crystallization reaction was terminated.

The obtained nickel cobalt metal composite hydroxide-containing slurry was washed and dehydrated, then dried at 105° C. for 24 hours and sieved to obtain a nickel-containing metal composite hydroxide 1. $(D_{H90}-D_{H10})/D_{H50}$ of the nickel-containing metal composite hydroxide 1 was 1.00.

The nickel-containing metal composite hydroxide 1 was heated at 650° C. for 5 hours to obtain a nickel-containing metal composite oxide 1.

The nickel-containing metal composite oxide 1, a lithium hydroxide powder, and an inert melting agent, potassium carbonate powder, were weighed and mixed together in a proportion of Li/(Ni+Co)=1.1 and $K_2CO_3/(LiOH+K_2CO_3)$ =0.1 (mol/mol), and then calcined in an oxygen atmosphere at 790° C. for 10 hours (calcining step) to obtain a mixture 1 containing LiMO-1. In Table 1, the amount of $K_2CO_3$ added is described as 10 mol %. The same will apply hereinafter.

The mixture 1 and pure water (water temperature 5° C.) were mixed together at such a proportion that the proportion of the mixture 1 to the total amount of the mixture 1 and pure water was 30 mass %, and the obtained slurry was stirred for 10 minutes.

The slurry was dehydrated, and the obtained solids were rinsed with pure water (liquid temperature 5° C.) of twice the mass of the mixture 1 used to prepare the above-described slurry (rinsing step). The solids were dehydrated again and subjected to a heat treatment in an oxygen atmosphere at 760° C. for 5 hours to obtain LiMO-1.

(Evaluation of LiMO-1)

As a result of performing the composition analysis of LiMO-1 and comparing the composition with Composition Formula (I), x was 1.01, y was 0.105, z was 0, and w was 0.

Figure 3:
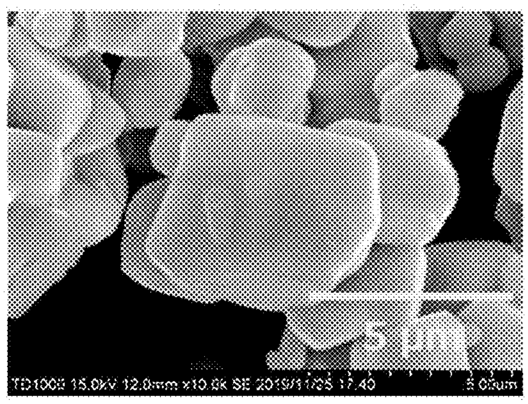
FIG. 3 is a SEM photograph of the lithium metal composite oxide produced in Example 1.

As a result of performing SEM observation of LiMO-1, it was confirmed that LiMO-1 contained both single particles and secondary particles. FIG. 3 shows a SEM image of single particles in LiMO-1.

The crystal structure of LiMO-1 was a layered rock-salt structure. For LiMO-1, the $L_A/L_B$, Me occupancy, BET specific surface area, average particle diameter of the single particle, $P1/D_{50}$, $L_B$, rate characteristics, and cycle characteristics are described in Table 2.

Example 2

LiMO-2 was obtained by performing the same operation as in Example 1, except that the calcining step was changed to two stages: at 760° C. for 5 hours and at 790° C. for 5 hours in an oxygen atmosphere.

(Evaluation of LiMO-2)

As a result of performing the composition analysis of LiMO-2 and comparing the composition with Composition Formula (I), x was 0.98, y was 0.106, z was 0, and w was 0.

Figure 4:
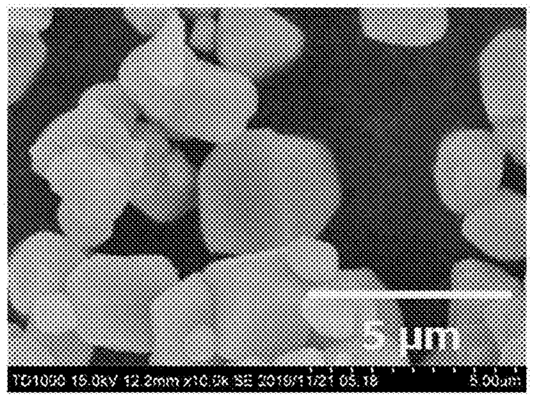
FIG. 4 is a SEM photograph of the lithium metal composite oxide produced in Example 2.

As a result of performing SEM observation of LiMO-2, it was confirmed that LiMO-2 contained both single particles and secondary particles. FIG. 4 shows a SEM image of single particles in LiMO-2.

The crystal structure of LiMO-2 was a layered rock-salt structure. For LiMO-2, the $L_A/L_B$, Me occupancy, BET specific surface area, average particle diameter of the single particle, $P1/D_{50}$, $L_B$, rate characteristics, and cycle characteristics are described in Table 2.

Example 3

A nickel-containing metal composite hydroxide 2 was obtained in the same manner as in Example 1, except that the metal raw material liquid mixture was supplied at a proportion of Ni:Co:Mn=88.5:9:2.5, the pH in the nucleus generation step was 11.3, and the pH in the nucleus growth step was 10.9.

$(D_{H90}-D_{H10})/D_{H50}$ of the nickel-containing metal composite hydroxide 2 was 0.95.

The nickel-containing metal composite hydroxide 2 was heated at 650° C. for 5 hours to obtain a nickel-containing metal composite oxide 2. LiMO-3 was obtained by performing the same operation as in Example 1, except that the nickel-containing metal composite oxide 2 was used instead of the nickel-containing metal composite oxide 1.

(Evaluation of LiMO-3)

As a result of performing the composition analysis of LiMO-3 and comparing the composition with Composition Formula (I), x was 1.03, y was 0.089, z was 0.026, and w was 0.

Figure 5:
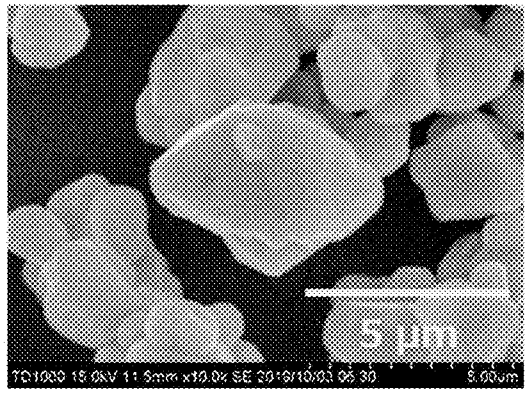
FIG. 5 is a SEM photograph of single particles of the lithium metal composite oxide produced in Example 3.
Figure 6:
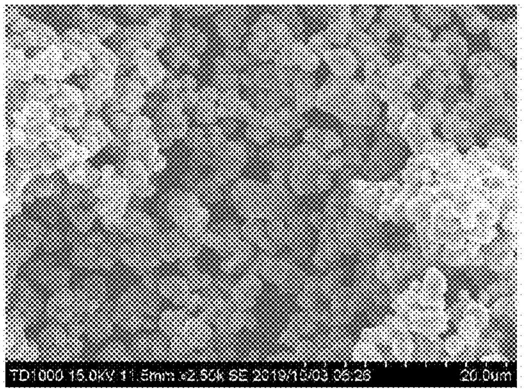
FIG. 6 is a SEM photograph including secondary particles of the lithium metal composite oxide produced in Example 3.

As a result of performing SEM observation of LiMO-3, it was confirmed that LiMO-3 contained both single particles and secondary particles. FIG. 5 shows a SEM image of single particles in LiMO-3, and FIG. 6 shows a SEM image including secondary particles in LiMO-3.

The crystal structure of LiMO-3 was a layered rock-salt structure. For LiMO-3, the $L_A/L_B$, Me occupancy, BET specific surface area, average particle diameter of the single particle, $P1/D_{50}$, $L_B$, rate characteristics, and cycle characteristics are described in Table 2.

Example 4

LiMO-4 was obtained by performing the same operation as in Example 3, except that the calcining step was changed to 820° C. for 10 hours.

(Evaluation of LiMO-4)

As a result of performing the composition analysis of LiMO-4 and comparing the composition with Composition Formula (I), x was 1.01, y was 0.089, z was 0.025, and w was 0.

Figure 7:
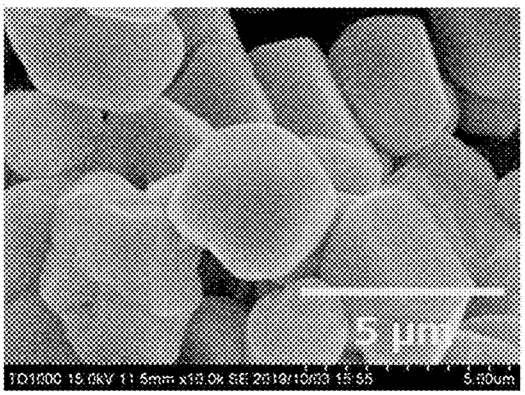
FIG. 7 is a SEM photograph of the lithium metal composite oxide produced in Example 4.

As a result of performing SEM observation of LiMO-4, it was confirmed that LiMO-4 contained both single particles and secondary particles. FIG. 7 shows a SEM image of single particles in LiMO-4.

The crystal structure of LiMO-4 was a layered rock-salt structure. For LiMO-4, the $L_A/L_B$, Me occupancy, BET specific surface area, average particle diameter of the single particle, $P1/D_{50}$, $L_B$, rate characteristics, and cycle characteristics are described in Table 2.

Comparative Example 1

A nickel sulfate aqueous solution, a cobalt sulfate aqueous solution, a manganese sulfate aqueous solution, and a zirconium sulfate aqueous solution were mixed together at such a proportion that the atomic ratio of Ni, Co, Mn, and Zr was 87.5:8:4:0.5 (Ni/Co/Mn=88/8/4), thereby preparing a raw material liquid mixture.

Next, this raw material liquid mixture and an ammonium sulfate aqueous solution, as a complexing agent, were continuously added into the reaction vessel under stirring. An aqueous solution of sodium hydroxide was timely added dropwise such that the pH of the solution in the reaction vessel reached 11.2 (at the time of measurement at a liquid temperature of 40° C.), and a reaction product was obtained.

The reaction product was washed, then dehydrated with a centrifuge, isolated, and dried at 105° C. to obtain a nickel-containing metal composite hydroxide 3.

$(D_{H90}-D_{H10})/D_{H50}$ of the nickel-containing metal composite hydroxide 3 was 1.07.

The nickel-containing metal composite hydroxide 3 was heated at 650° C. for 5 hours to obtain a nickel-containing metal composite oxide 3.

LiMO-5 was obtained by performing the same operation as in Example 1, except that the nickel-containing metal composite oxide 3 was used instead of the nickel-containing metal composite oxide 1.

(Evaluation of LiMO-5)

As a result of performing the composition analysis of LiMO-5 and comparing the composition with Composition Formula (I), x was 0.99, y was 0.076, z was 0.040, and w was 0.002.

Figure 8:
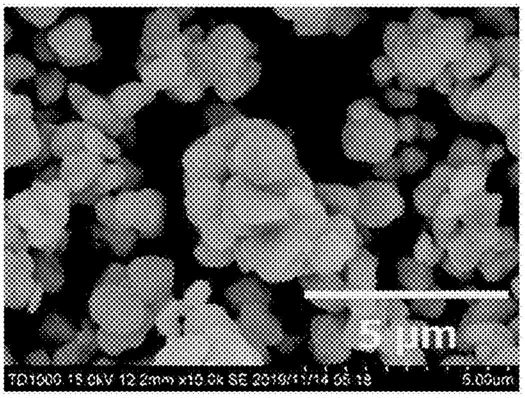
FIG. 8 is a SEM photograph of the lithium metal composite oxide produced in Comparative Example 1.

As a result of performing SEM observation of LiMO-5, it was confirmed that LiMO-5 contained both single particles and secondary particles. FIG. 8 shows a SEM image of single particles in LiMO-5.

The crystal structure of LiMO-5 was a layered rock-salt structure. For LiMO-5, the $L_A/L_B$, Me occupancy, BET specific surface area, average particle diameter of the single particle, $P1/D_{50}$, $L_B$, rate characteristics, and cycle characteristics are described in Table 2.

Comparative Example 2

LiMO-6 was obtained by performing the same operation as in Example 1, except that the heating temperature of the nickel-containing metal composite hydroxide 1 was changed from 650° C. to 800° C.

(Evaluation of LiMO-6)

As a result of performing the composition analysis of LiMO-6 and comparing the composition with Composition Formula (I), x was 0.89, y was 0.105, z was 0, and w was 0.

Figure 9:
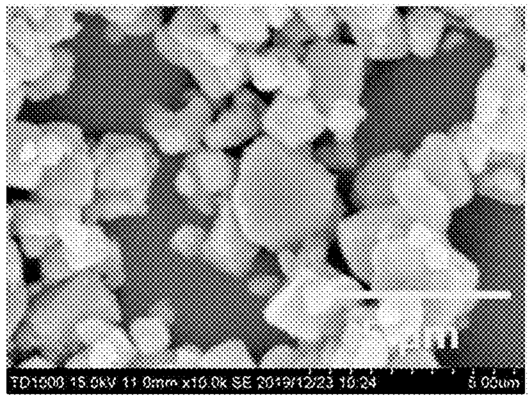
FIG. 9 is a SEM photograph of the lithium metal composite oxide produced in Comparative Example 2.

As a result of performing SEM observation of LiMO-6, it was confirmed that LiMO-6 contained both single particles and secondary particles. FIG. 9 shows a SEM image of single particles in LiMO-6.

The crystal structure of LiMO-6 was a layered rock-salt structure. For LiMO-6, the $L_A/L_B$, Me occupancy, BET specific surface area, average particle diameter of the single particle, $P1/D_{50}$, $L_B$, rate characteristics, and cycle characteristics are described in Table 2.

Comparative Example 3

A nickel sulfate aqueous solution, a cobalt sulfate aqueous solution, and manganese sulfate were mixed together at such a proportion that the atomic ratio of Ni, Co, and Mn was 91:5:4, thereby preparing a raw material liquid mixture.

Next, this raw material liquid mixture and an ammonium sulfate aqueous solution, as a complexing agent, were continuously added into the reaction vessel under stirring. An aqueous solution of sodium hydroxide was timely added dropwise such that the pH of the solution in the reaction vessel reached 11.2 (at the time of measurement at a liquid temperature of 40° C.), and a reaction product was obtained.

The reaction product was washed, then dehydrated with a centrifuge, isolated, and dried at 105° C. to obtain a nickel-containing metal composite hydroxide 4.

Using the Elbow-Jet air classifier (Matsubo EJ-L-3 model), the nickel-containing metal composite hydroxide 4 was classified as follows: small particle size side classified particles:medium particle size side classified particles:large particle size side classified particles (ratio by weight %)=20:50:30.

$(D_{H90}-D_{H10})/D_{H50}$ of the medium particle size side classified particles of the nickel-containing metal composite hydroxide 4 was 0.93.

The medium particle size side classified particles were heated at 650° C. for 5 hours to obtain a nickel-containing metal composite oxide 4.

LiMO-7 was obtained by performing the same operation as in Example 1, except that the nickel-containing metal composite oxide 4, a lithium hydroxide powder, and a potassium hydroxide powder were weighed and mixed together in a proportion of Li/(Ni+Co+Mn)=1.1 and KOH/(LiOH+KOH)=0.1 (mol/mol).

(Evaluation of LiMO-7)

As a result of performing the composition analysis of LiMO-7 and comparing the composition with Composition Formula (I), x was 1.02, y was 0.049, z was 0.033, and w was 0.

Figure 10:
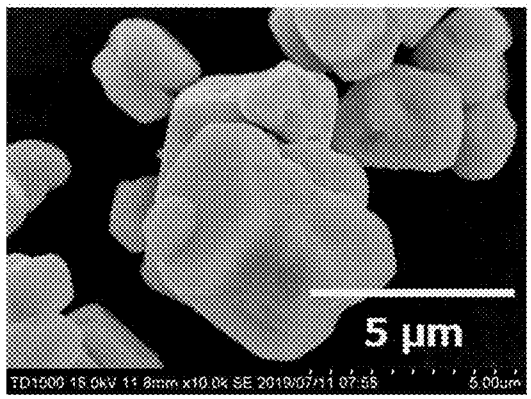
FIG. 10 is a SEM photograph of the lithium metal composite oxide produced in Comparative Example 3.

As a result of performing SEM observation of LiMO-7, it was confirmed that LiMO-7 contained both single particles and secondary particles. FIG. 10 shows a SEM image of single particles in LiMO-7.

The crystal structure of LiMO-7 was a layered rock-salt structure. For LiMO-7, the $L_A/L_B$, Me occupancy, BET specific surface area, average particle diameter of the single particle, $P1/D_{50}$, $L_B$, rate characteristics, and cycle characteristics are described in Table 2.

Comparative Example 4

A nickel-containing metal composite hydroxide 5 was obtained in the same manner as in Example 1, except that the metal raw material liquid mixture was supplied at a proportion of Ni:Co:Mn=88:8:4, the pH in the nucleus generation step was 11.6, and the pH in the nucleus growth step was 11.0. $(D_{H90}-D_{H10})/D_{H50}$ of the nickel-containing metal composite hydroxide 5 was 1.02. The nickel-containing metal composite hydroxide 5 was heated at 650° C. for 5 hours to obtain a nickel-containing metal composite oxide 5.

LiMO-8 was obtained by performing the same operation as in Example 1, except that the nickel-containing metal composite oxide 5, a lithium hydroxide powder, and a potassium carbonate powder were weighed and mixed together in a proportion of Li/(Ni+Co+Mn)=1.1 and $K_2CO_3/(LiOH+K_2CO_3)$=0.05 (mol/mol).

(Evaluation of LiMO-8)

As a result of performing the composition analysis of LiMO-8 and comparing the composition with Composition Formula (I), x was 1.06, y was 0.050, z was 0.043, and w was 0.

Figure 11:
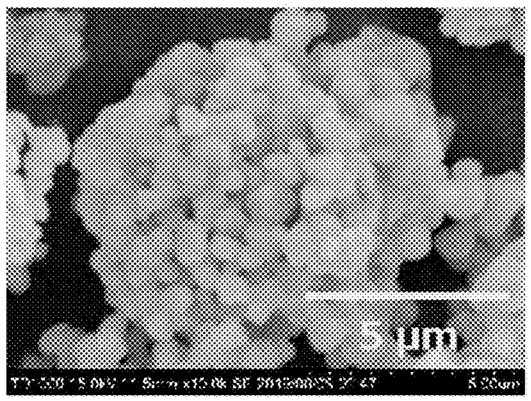
FIG. 11 is a SEM photograph of the lithium metal composite oxide produced in Comparative Example 4.

As a result of performing SEM observation of LiMO-8, it was confirmed that LiMO-8 contained no single particles and was composed only of secondary particles. Therefore, the "average particle diameter of single particle: 1.1 m" in Comparative Example 4 described in Table 2 means the average particle diameter of the primary particles that constitute the secondary particle. FIG. 11 shows a SEM image of secondary particles in LiMO-8.

The crystal structure of LiMO-8 was a layered rock-salt structure. For LiMO8, the $L_A/L_B$, Me occupancy, BET specific surface area, average particle diameter of the single particle, $P1/D_{50}$, $L_B$, rate characteristics, and cycle characteristics are described in Table 2.

Table 1 below describes the ratio of Ni/Co/Mn charged, the $(D_{H90}-D_{H10})/D_{H50}$ and oxidization temperature of the metal composite hydroxide, and the inert melting agent.

TABLE 1

| | | Metal composite hydroxide | | Inert melting agent | |
|---|---|---|---|---|---|
| | Ni/Co/Mn | $(D_{H90}-D_{H10})/D_{H50}$ | Oxidization temperature (° C.) | Type | Amount added (mol %) |
| Example 1 | 89/11/0 | 1.00 | 650 | $K_2CO_3$ | 10 |
| Example 2 | 89/11/0 | 1.00 | 650 | $K_2CO_3$ | 10 |
| Example 3 | 88.5/9/2.5 | 0.95 | 650 | $K_2CO_3$ | 10 |
| Example 4 | 88.5/9/2.5 | 0.95 | 650 | $K_2CO_3$ | 10 |
| Comparative Example 1 | 88/8/4 | 1.07 | 650 | $K_2CO_3$ | 10 |
| Comparative Example 2 | 89/11/0 | 1.00 | 800 | $K_2CO_3$ | 10 |
| Comparative Example 3 | 91/5/4 | 0.93 | 650 | KOH | 10 |
| Comparative Example 4 | 88/8/4 | 1.02 | 650 | $K_2CO_3$ | 5 |

TABLE 2

| | Crystal structure | Li/Me | Composition Formula (I) x | y | z | w | $L_A/L_B$ — | Me occupancy % | BET specific surface area $m^2/g$ | Average particle diameter of single particle μm | $P1/D_{50}$ — | $L_B$ Å | Rate characteristics % | Cycle characteristics % |
|---|---|---|---|---|---|---|---|---|---|---|---|---|---|---|
| Example 1 | Layered rock-salt type | 1.01 | 1.01 | 0.105 | 0.000 | 0.000 | 1.23 | 0.36 | 0.39 | 3.2 | 0.33 | 850 | 87.7 | 90.3 |
| Example 2 | Layered rock-salt type | 0.98 | 0.98 | 0.106 | 0.000 | 0.000 | 1.42 | 1.6 | 0.67 | 3.2 | 0.83 | 914 | 88.4 | 88.6 |
| Example 3 | Layered rock-salt type | 1.03 | 1.03 | 0.089 | 0.026 | 0.000 | 1.45 | 1.2 | 0.61 | 3.1 | 0.55 | 945 | 88.6 | 90.1 |
| Example 4 | Layered rock-salt type | 1.01 | 1.01 | 0.089 | 0.025 | 0.000 | 1.45 | 1.2 | 0.43 | 2.0 | 0.31 | 867 | 88.9 | 87.4 |
| Comparative Example 1 | Layered rock-salt type | 0.99 | 0.99 | 0.076 | 0.040 | 0.002 | 1.34 | 2.8 | 1.11 | 1.4 | 0.41 | 779 | 90.2 | 82.5 |
| Comparative Example 2 | Layered rock-salt type | 0.89 | 0.89 | 0.105 | 0.000 | 0.000 | 1.48 | 4.7 | 1.21 | 1.8 | 0.50 | 450 | 70.8 | 58.2 |
| Comparative Example 3 | Layered rock-salt type | 1.02 | 1.02 | 0.049 | 0.033 | 0.000 | 1.17 | 0.85 | 0.49 | 2.9 | 0.43 | 1106 | 75.5 | 65.4 |
| Comparative Example 4 | Layered rock-salt type | 1.06 | 1.06 | 0.050 | 0.043 | 0.000 | 1.6 | 1.9 | 1.21 | 1.1 | 0.20 | 609 | 88.3 | 81.4 |

As shown in the above results, Examples 1 to 4, whose $L_A/L_B$ and the Me occupancy were in the ranges of the present invention, had both excellent rate characteristics and cycle characteristics.

In Comparative Example 1, $(D_{H90}-D_{H10})/D_{H50}$ was more than 1, and therefore, it is considered that cation mixing progressed. This resulted in a lack of lithium ions, which made it easy for the capacity of the lithium secondary battery to decrease and provided poor cycle characteristics.

In Comparative Example 2, the oxidization temperature of the metal composite hydroxide was high, which is considered to have caused cation mixing to progress. This resulted in a lack of lithium ions, which made it easy for the capacity of the lithium secondary battery to decrease and provided poor rate characteristics and cycle characteristics.

In Comparative Example 3, KOH was used as the inert melting agent, resulting in excessive anisotropic growth of crystals. This resulted in long diffusion paths of lithium ions and increased internal resistance, which is considered to have caused deterioration of rate characteristics and cycle characteristics.

In Comparative Example 4, the amount of the inert melting agent added was small and the growth of single particles was not sufficiently accelerated, resulting in poor rate characteristics and cycle characteristics.

REFERENCE SIGNS LIST

1: Separator, 3: Negative electrode, 4: Electrode group, 5: Battery can, 6: Electrolytic solution, 7: Top insulator, 8: Sealing body, 10: Lithium secondary battery, 21: Positive lead, 100: Laminate, 110: Positive electrode, 111: Positive electrode active material layer, 112: Positive electrode current collector, 113: External terminal, 120: Negative electrode, 121: Negative electrode active material layer, 122: Negative electrode current collector, 123: External terminal, 130: Solid electrolyte layer, 200: Exterior body, **200*a*: Opening portion, 1000**: All-solid-state lithium secondary battery

The invention claimed is:

1. A lithium metal composite oxide comprising:

a secondary particle which is an aggregate of primary particles; and a single particle which exists independently of the secondary particle, wherein the lithium metal composite oxide has a layered rock-salt structure, is represented by Composition Formula (I) below, satisfies (1) and (2) below, $$Li_xNi_{1-y-z-w}Co_yMn_zX1_wO_2 \quad (I)$$

(here, Composition Formula (I) satisfies 0.9≤x≤1.2, 0≤y≤0.4, 0≤z≤0.4, 0≤w≤0.1, and y+z+w≤1, and X1 represents one or more elements selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn), $$1.20 \leq L_A/L_B < 1.60 \quad (1)$$

($L_A$ is a crystallite diameter obtained from a diffraction peak 1 within a range of 2θ=18.8±1° and $L_B$ is a crystallite diameter obtained from a diffraction peak 2 within a range of 2θ=38.3±1° in a diffraction peak obtained from powder X-ray diffraction using CuKα rays), and (2): a Me occupancy at a lithium site in the layered rock-salt structure is 2.5% or less, as determined by analyzing the diffraction peaks by the Rietveld analysis method, and the Me is Ni, Co, Mn, or X1.

2. The lithium metal composite oxide according to claim 1, wherein z satisfies $0 \le z \le 0.2$.

3. The lithium metal composite oxide according to claim 1, wherein a BET specific surface area is 1.0 $m^2/g$ or less.

4. The lithium metal composite oxide according to claim 1, wherein the single particle has an average particle diameter of 2.0 μm or more and 10 μm or less.

5. The lithium metal composite oxide according to claim 1, wherein (3) below is satisfied, $$0.30 \le P1/D_{50} \quad (3)$$

(P1 is an average particle diameter (μm) of the single particle, and $D_{50}$ is a 50% cumulative volume particle diameter (μm) of the lithium metal composite oxide, as obtained from a volume-based cumulative particle size distribution curve measured by a laser diffraction scattering method).

6. The lithium metal composite oxide according to claim 1, wherein $L_B$ is 1000 Å or less.

7. A positive electrode active material for a lithium secondary battery, comprising:

the lithium metal composite oxide according to claim 1.

8. A positive electrode for a lithium secondary battery, comprising:

the positive electrode active material for the lithium secondary battery according to claim 7.

9. A lithium secondary battery comprising:

the positive electrode for the lithium secondary battery according to claim 8.

10. The lithium metal composite oxide according to claim 2, wherein a BET specific surface area is 1.0 $m^2/g$ or less.

11. The lithium metal composite oxide according to claim 2, wherein the single particle has an average particle diameter of 2.0 μm or more and 10 μm or less.

12. The lithium metal composite oxide according to claim 2, wherein (3) below is satisfied, $$0.30 \le P1/D_{50} \quad (3)$$

(P1 is an average particle diameter (μm) of the single particle, and $D_{50}$ is a 50% cumulative volume particle diameter (μm) of the lithium metal composite oxide, as obtained from a volume-based cumulative particle size distribution curve measured by a laser diffraction scattering method).

13. The lithium metal composite oxide according to claim 2, wherein $L_B$ is 1000 Å or less.

14. A positive electrode active material for a lithium secondary battery, comprising:

the lithium metal composite oxide according to claim 2.

15. A positive electrode for a lithium secondary battery, comprising:

the positive electrode active material for the lithium secondary battery according to claim 14.

16. A lithium secondary battery comprising:

the positive electrode for the lithium secondary battery according to claim 15.

* * * * *